US00RE36226E

United States Patent [19]

Antonio

[11] E Patent Number: Re. 36,226

[45] Reissued Date of Patent: Jun. 8, 1999

[54] MODULAR SYSTEM FOR OBTAINING EQUIPPED WALLS AND WORKBENCHES IN PARTICULAR FOR USE IN LABORATORIES

[75] Inventor: Buzzi Antonio, Busto Arsizio, Italy

[73] Assignee: Wright Line, Inc., Worcester, Mass.

[21] Appl. No.: 08/448,695

[22] Filed: May 24, 1995

Related U.S. Patent Documents

Reissue of:

[64] Patent No.: 5,212,915
Issued: May 25, 1993
Appl. No.: 08/770,629
Filed: Oct. 3, 1991

[30] Foreign Application Priority Data

Nov. 21, 1990 [IT] Italy ..... 22132 A-90

[51] Int. Cl.[6] ..... E04H 1/00

[52] U.S. Cl. ..... 52/79.1; 52/36.1; 52/220.7

[58] Field of Search ..... 52/36.1, 36.4, 52/36.5, 36.6, 239, 79.1, 720, 220.1, 733.2, 736.1, 739.1, 780, 781

[56] References Cited

U.S. PATENT DOCUMENTS

| | | | |
|---|---|---|---|
| 3,513,606 | 5/1970 | Jones | 52/780 |
| 3,921,347 | 11/1975 | Paisley | 52/36.4 |
| 4,026,084 | 5/1977 | Goose | 52/780 |
| 4,685,255 | 8/1987 | Kelley | 52/221 |
| 4,876,835 | 10/1989 | Kelley | 52/239 |
| 4,914,873 | 4/1990 | Newhouse | 52/36 |
| 5,116,007 | 5/1992 | Gunton | 248/243 |
| 5,212,915 | 5/1993 | Buzzi | 52/79.1 |
| 5,291,700 | 3/1994 | Chew | 52/36.4 X |
| 5,297,368 | 3/1994 | Okada | 52/109 X |

*Primary Examiner*—Carl D. Friedman
*Assistant Examiner*—Beth Aubrey
*Attorney, Agent, or Firm*—Quarles & Brady

[57] ABSTRACT

A modular system for erecting workbenches and equipped walls, in particular for use in laboratories, comprises a structure constructed of modular uprights and crosspieces to which beams can be fixed which permit supports for pieces of furniture, working tables, etc . . . , to be fitted in a slidable manner[. M], *m*ounted to the wall are also panels including electrical connections, panels for fluid supply, etc . . . , which have all of the components entirely received inside the associated wall in a flush-relationship therewith.

13 Claims, 9 Drawing Sheets

FIG. 2a
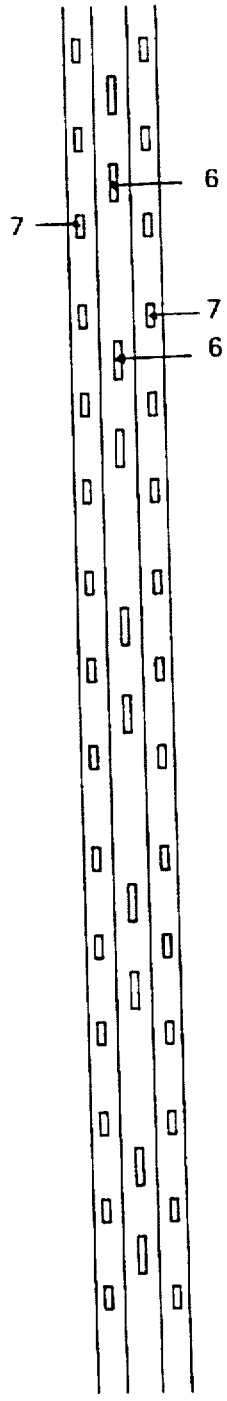
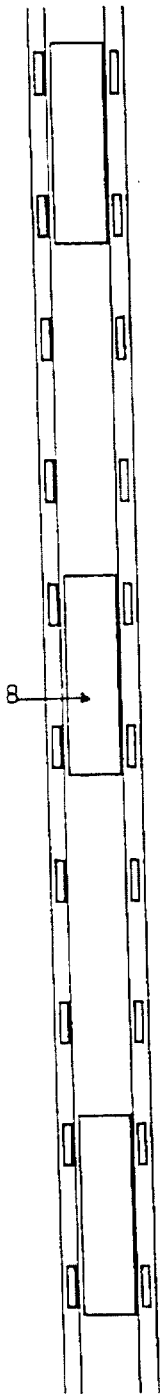
FIG. 2b
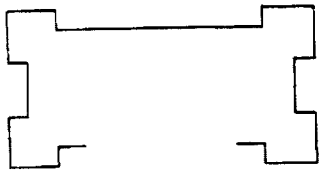
FIG. 2c
FIG. 12
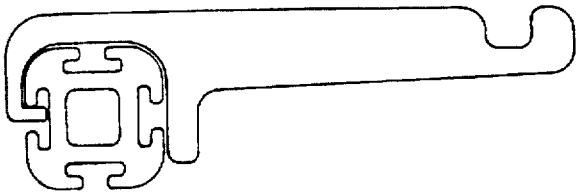
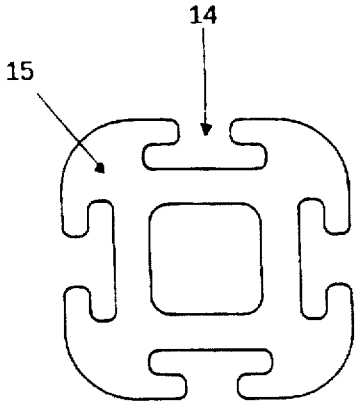
FIG. 3

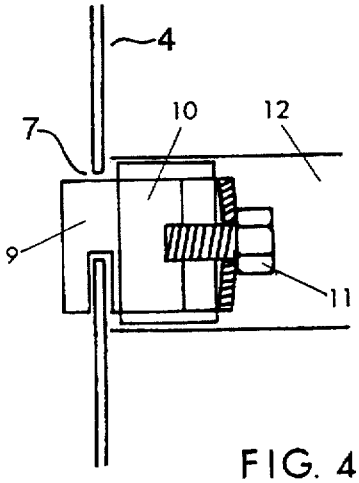
FIG. 4b
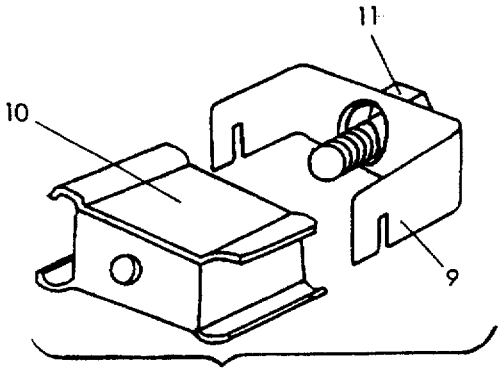
FIG. 4a
FIG. 5
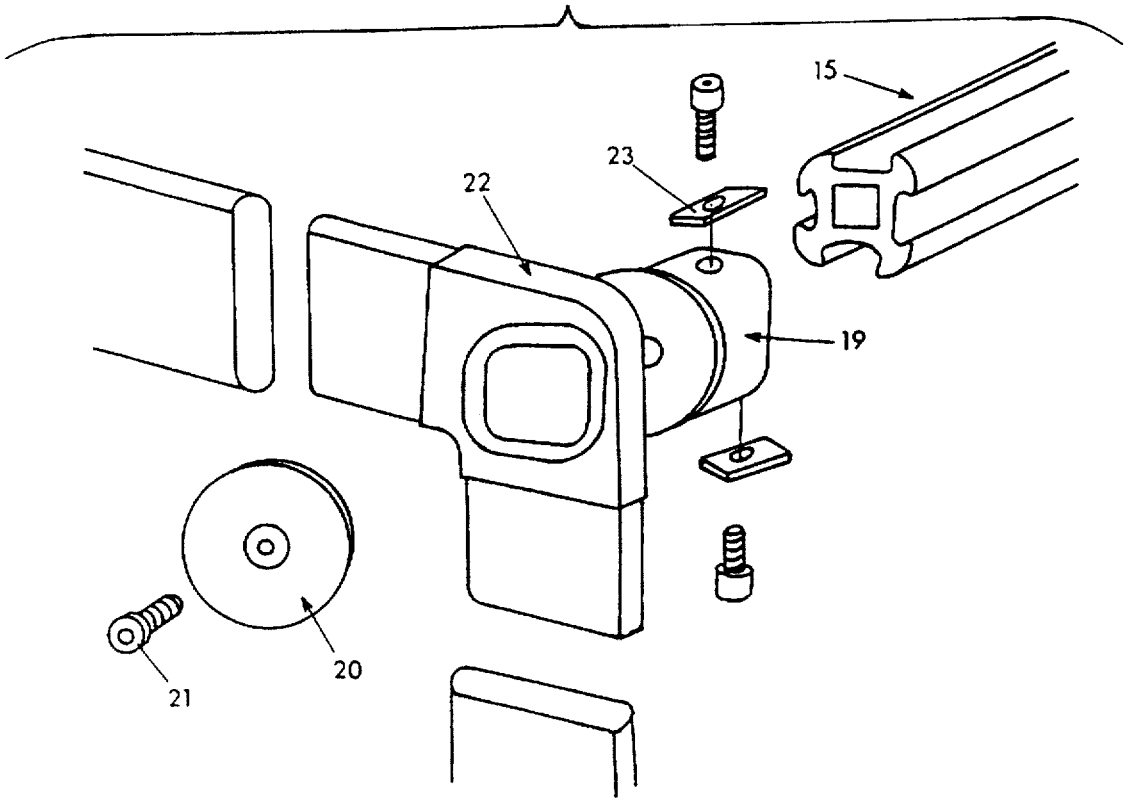

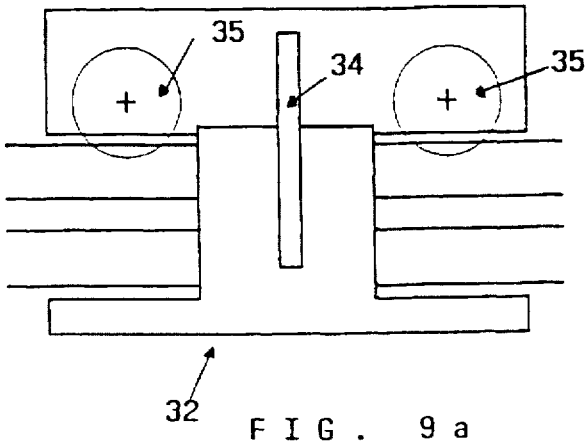
FIG. 9a
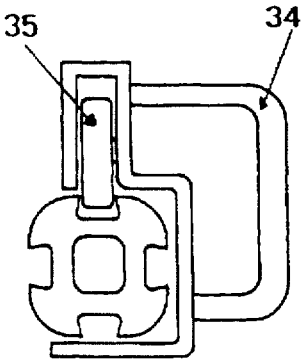
FIG. 9b
FIG. 10a
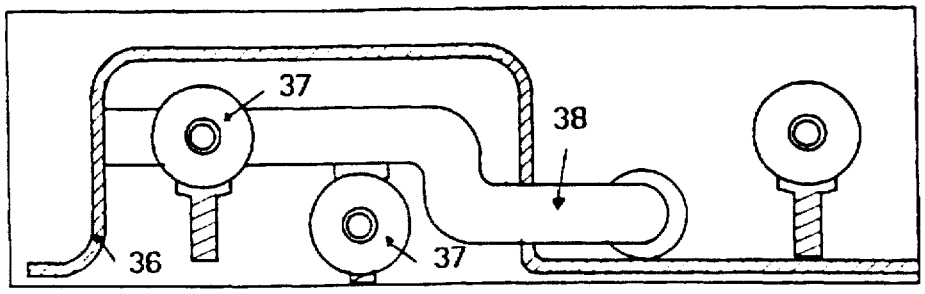
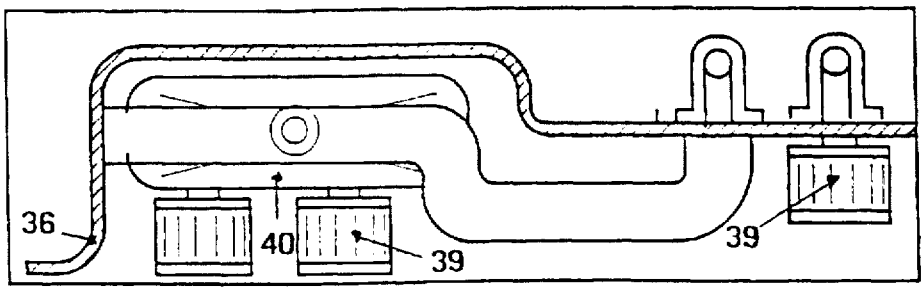
FIG. 10b

MODULAR SYSTEM FOR OBTAINING EQUIPPED WALLS AND WORKBENCHES IN PARTICULAR FOR USE IN LABORATORIES

Matter enclosed in heavy brackets [ ] appears in the original patent but forms no part of this reissue specification; matter printed in italics indicates the additions made by reissue.

FIELD OF THE INVENTION

This invention relates to a modular system for obtaining benches and equipped walls designed for use in laboratories or the like.

More particularly, it deals with a system comprising a modular structure constructed of uprights and crosspieces to which beams are fixed permitting supports for pieces of furniture, working tables, shelves, etc., to be fitted in a slidable manner thereto.

The equipped wall can also have utility panels mounted to it which include connection means for water, gas, electricity, as well as the associated discharge means, all of which are entirely received inside the wall in a flush-relationship with it.

The above features ensure considerable flexibility in arrangement to give a user the possibility of developing personalized furnishings with the utilities being positioned where they are of effective service. Thereby permitting, for example, suitable supply and discharge means to be properly located adjacent each associated apparatus and benches or any other components and to be varied in arrangement as a function of changes in instant requirements, without any expensive operation having to be resorted to.

BACKGROUND OF THE INVENTION

Equipped walls and associated workbenches are already known and are, for example, used in laboratories or the like in order to obtain work stations each provided with the required utilities.

These equipped walls are constructed of structure units that are mounted in proper locations and to which the shelves and the pieces of furniture forming the workbenches are fitted.

The structure of said equipped walls includes ducts and passages for water and gas inlet pipes, for electricity supply means, and all what is necessary for the employed equipment to operate.

The fluid supply devices, in particular cocks, etc . . . , are fitted to the wall so as to slightly project therefrom. The discharge means are, therefore, generally built in the workbenches which are fixed and connected to discharge pipes in the wall.

This solution, which has been long known and used has, however, limitations particularly in that an assembly, when mounted, is poor in flexibility and cannot be modified unless expensive operations are performed.

This requires that a planning is made in advance about what the distribution of structure units inside a room and the arrangement of instruments on workbenches will have to be.

Once a bench or wall is constructed, no alterations can be performed thereto, unless works of substantial importance are undertaken. Thus, by way of example, should it be decided that a water inlet is to be displaced, this would mean that the entire bench with the relative water outlet is to be displaced and a proper connection to pipes in the wall created, which is certainly a very complicated operation.

The same holds when a working surface is to be displaced, such an operation requiring at present that change to the installation system should be made by skilled hands.

Also, once the structure units are mounted, it is not possible to change their arrangement in order, for example, to adapt them to new rooms or to make them fit to different conditions of work which would have occurred meanwhile.

For these reasons, a need is felt in this field for means permitting the above difficulties to be overcome by the obtention of modular structures which are easy to assemble and/or to alter without expensive operations or skilled hands being necessary.

SUMMARY AND OBJECTS OF THE INVENTION

Thus, it is an object of this invention to provide a modular system for obtaining benches and equipped walls, comprising a structure which includes uprights and crossmembers forming a wall framework to which beams are fitted for enabling benches or working surfaces with associated pieces of furniture to be mounted in a slidable manner thereto.

The inlets and corresponding outlets for fluids to be supplied to, and discharged from different utilities are flush-mounted in said wall so as to leave working surfaces clear.

These and other features and advantages of the present invention will be more clearly understood when reading the following detailed description, given by way of example only, with particular reference to the accompanying drawings.

BRIEF DESCRIPTION OF THE DRAWINGS

FIGS. 2a to 2c show, in sectional views, a section member used to form the support structure for an equipped wall;

FIG. 3 is a sectional view of a beam as used in equipped-wall structures according to the invention;

FIG. 4a is an exploded view showing devices for connecting and locking in place section members forming a structure;

FIG. 4b is a sectional view of the devices in FIG. 4a when mounted;

FIG. 5 is an exploded view of a joint in a structure according to the invention;

FIGS. 9a and 9b are front and sectional view, respectively, showing devices for supporting a piece of furniture in a bench according to the invention;

FIGS. 10a and 10b are sectional horizontal views showing two utility panels with associated fluid supply devices in an equipped wall of the invention;

FIG. 12 is a detail view of a support for a shelf;

DETAILED DESCRIPTION OF THE PREFERRED EMBODIMENT

According to the system of the invention, a set of section members are used to provide a corresponding set of modular uprights and crosspieces and these are assembled together to obtain the bearing structure for an equipped wall in the inside of which there are arranged ducts for the different utilities, while working tables and associated pieces of furniture—which are also of modular type and make a part of the invention—are mounted to the same equipped wall.

Figure 1:
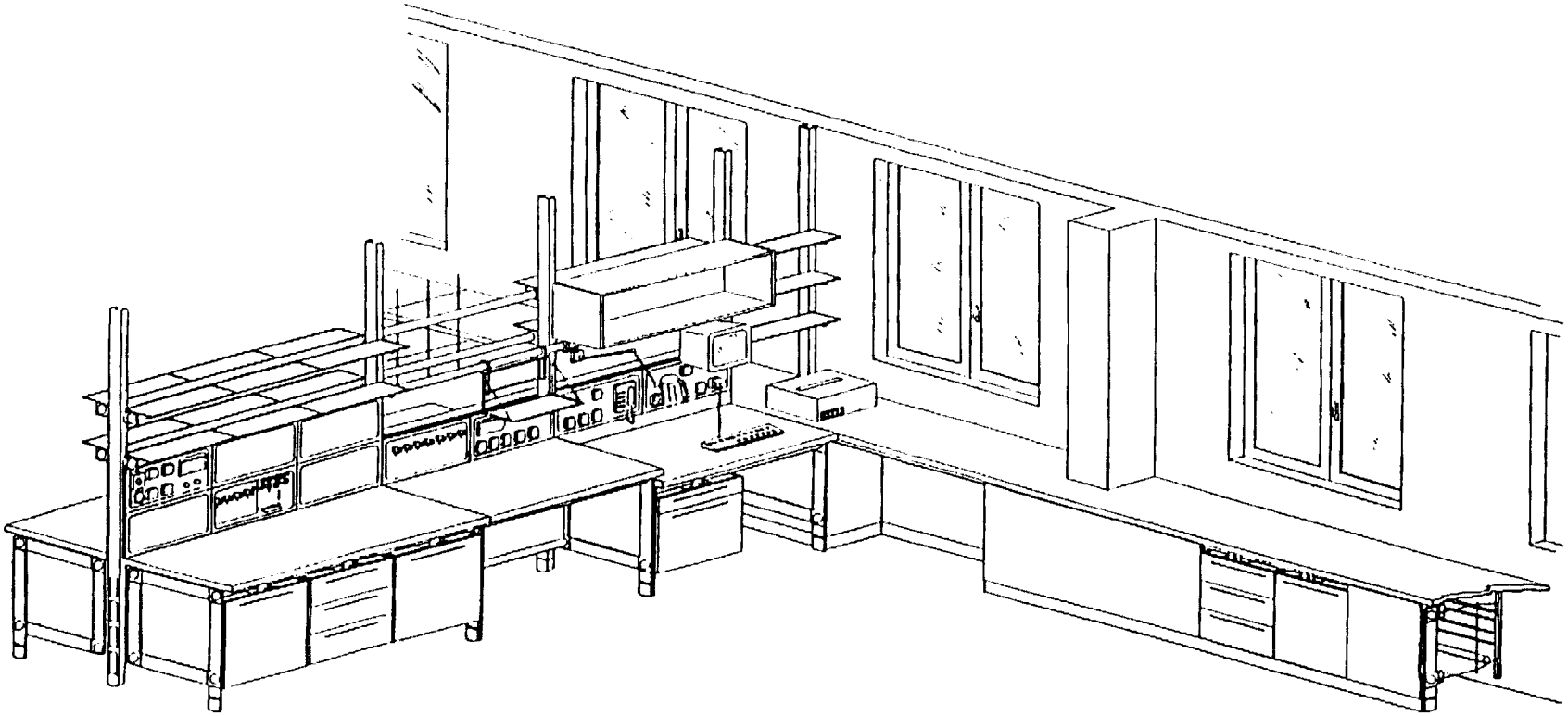
FIGS. 1 and 2 are perspective views of equipped walls provided with workbenches obtained by using components according to this invention.
Figure 2:
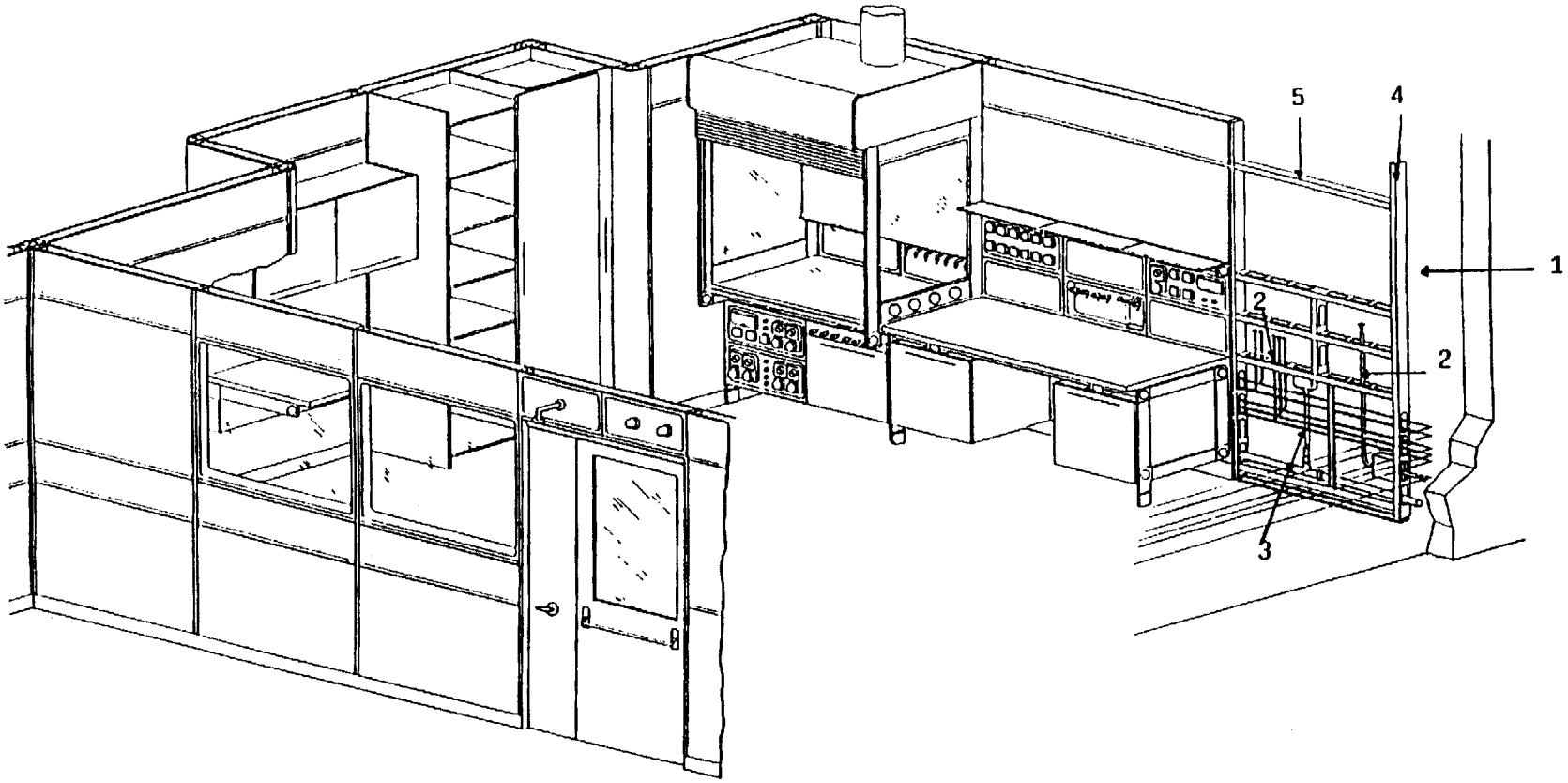

FIGS. 1 and 2 show, by way of example, some solutions that can be conceived in accordance with the system of the invention. In particular, shown to the right of FIG. 2, is a partly open wall, broadly designated by reference number 1, in the inside of which fluid inlet pipes 2, discharge pipes 3, electrical cables, etc . . . can run.

Still referring to FIG. 2, the bearing structure of the wall is constructed of a plurality of uprights 4 interconnected by crosspieces 5.

These uprights and crosspieces consist of a corresponding plurality of section members shown in FIGS. 2a to 2c.

More particularly, the section members have a plurality of slots 6 centrally formed along the length thereof and two series of slots 7 are provided on the sides. Slots 6 receive the fastenings for both the crosspieces and the beams supporting the workroom furnishings, while slots 7 are for fitting panels carrying the various utilities to the equipped wall.

Some of the crosspieces and the uprights are provided on part of their height with greater size openings, designated by reference number 8 FIG. 2b, to permit pipes to pass therethrough.

FIGS. 4a and 4b show a system for connecting the crosspieces and uprights to each other.

In particular, a C-shaped member or means as indicated by reference number 9, is fixed in a known manner to the ends of each crosspiece, and the legs of this C-shaped member, which are jutting out with respect to the end-most portion of crosspiece, have slits formed adjacent their ends to define a hook-like element or catch means for fitting into upright slots 7. A sliding block 10 is mounted inside the legs of member 9 and has a threading therein for engaging a screw 11 or the like.

On assembly (FIG. 4b), the ends of the legs of C-shaped member 9 are inserted in slots 7 of an upright 4. Tightening or rotating of screw 11 will urge or slide the block 10 causing it to press against the upright 4. This pressing of the block 10 against the upright causes both the C-shaped member 9 and the crosspiece attached thereto to experience an opposite force away from the upright 4, and the hook like element of the C-shaped member 9 then locks the C-shaped member 9 and the attached crosspiece to the upright 4 in cooperation with this opposite force.

When the bearing structure for the equipped wall has been thus formed, a series of beams having the cross-section as shown FIG. 3 are attached to the structure.

This beam 100 is substantially quadrangular in cross-section and is provided on each side with a longitudinal downwardly widening groove 14. As a result, the sidewalls of grooves 14 each define an in-turned rim 15.

It is to these beams that are then mounted the pieces of furniture, working tables and any fittings and accessories that are necessary to equip a workbench.

For the sake of clarity, reference will be made in the following to "bench" to mean a working surface fixed to the wall, and to "piece of furniture" to mean any receptacle which may, or not, be closed and which is itself fixed to the associated wall, preferably beneath a working surface.

The beams, one of which is broadly designated by 15, FIG. 5, are attached to the structure of the equipped wall or to a framework intended to form a vertical wall of a bench.

Figure 14:
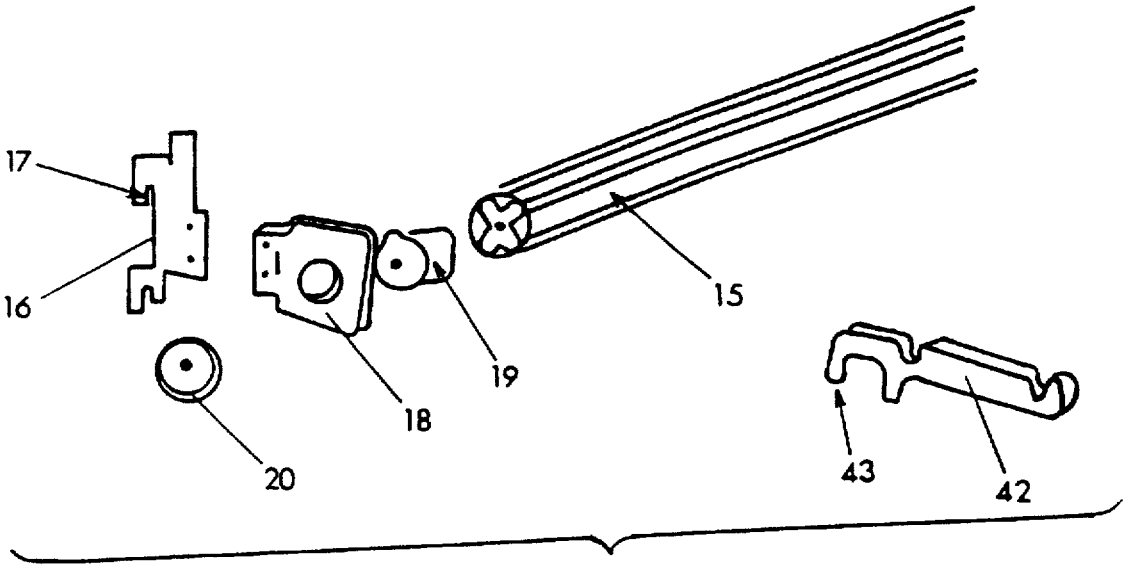
FIG. 14 is an exploded view of devices for connecting the bench-supporting beams to the wall.

The devices or beam support means for permitting connection to the structure of an equipped wall are shown FIG. 14 and include a support 16 which has a pair of hook-shaped extensions or beam catch means 17 for fitting into central upright slots 6, and to which a plate 18 is attached for mounting a beam thereto. This latter is inserted at its end in a head member or support 19 which is properly shaped so as to enable it to be introduced, in part, into a central opening in plate 18 while the other side thereof receives a cover 20. The entire assembly can then be locked in position by the aid of a screw 21 (these devices are best seen FIG. 5 where an angle member 22 has been substituted for plate 10 and will be described in more details below).

In order to prevent a beam 100 from being drawn off a support 19 fastener plates 23 or the like are fitted into grooves 14 and are then locked in place by the aid of screws or a similar fastening system which also engages the support 19.

Figure 7:
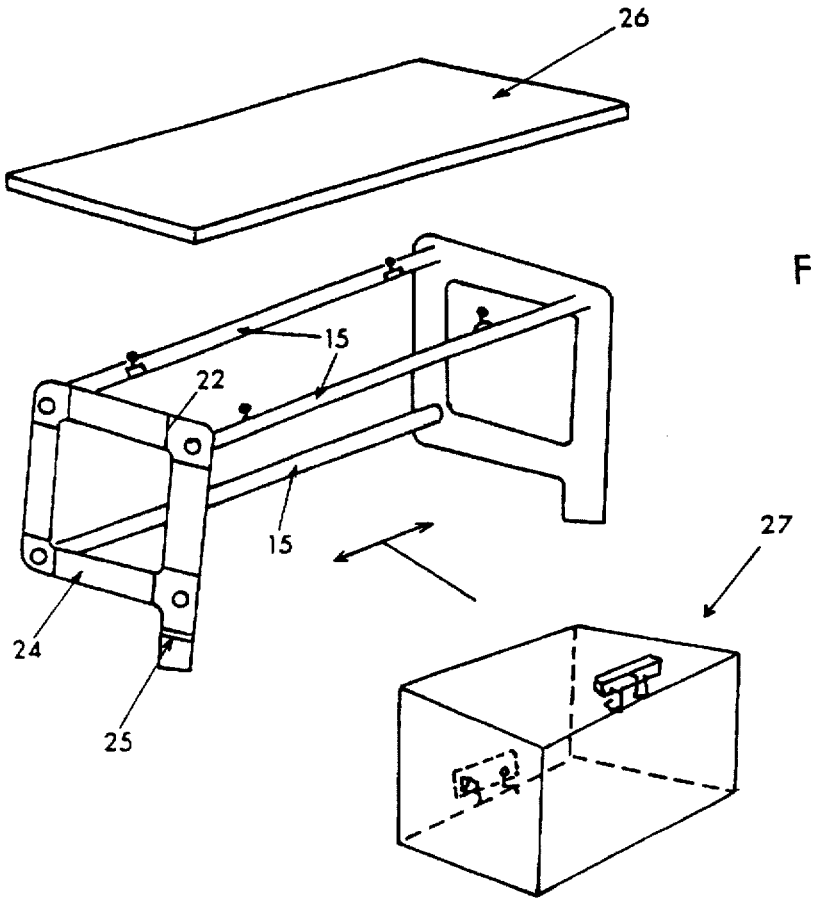
FIG. 7 is an exploded view of a bench structure in a system according to the invention.

As mentioned above, the angle member 22 serves as the connecting member for the components of a benchwall structure which is best seen FIG. 7.

The bench walls are each constructed of a set of sections 24 connected together by means of angle members 22 two of which (FIG. 8) are in turn fixed to hooking devices 16 similar to that described in connection with FIG. 12.

Thus, a structure is obtained which is fixed, on one side, to the equipped wall and which can bear, on the other side, on the floor through adjustable feet 25.

This structure permits a bench or support table 26 to be fixed thereto as well as a piece of furniture, such as that broadly indicated by 27, FIG. 7, to be mounted to same structure.

Figure 6:
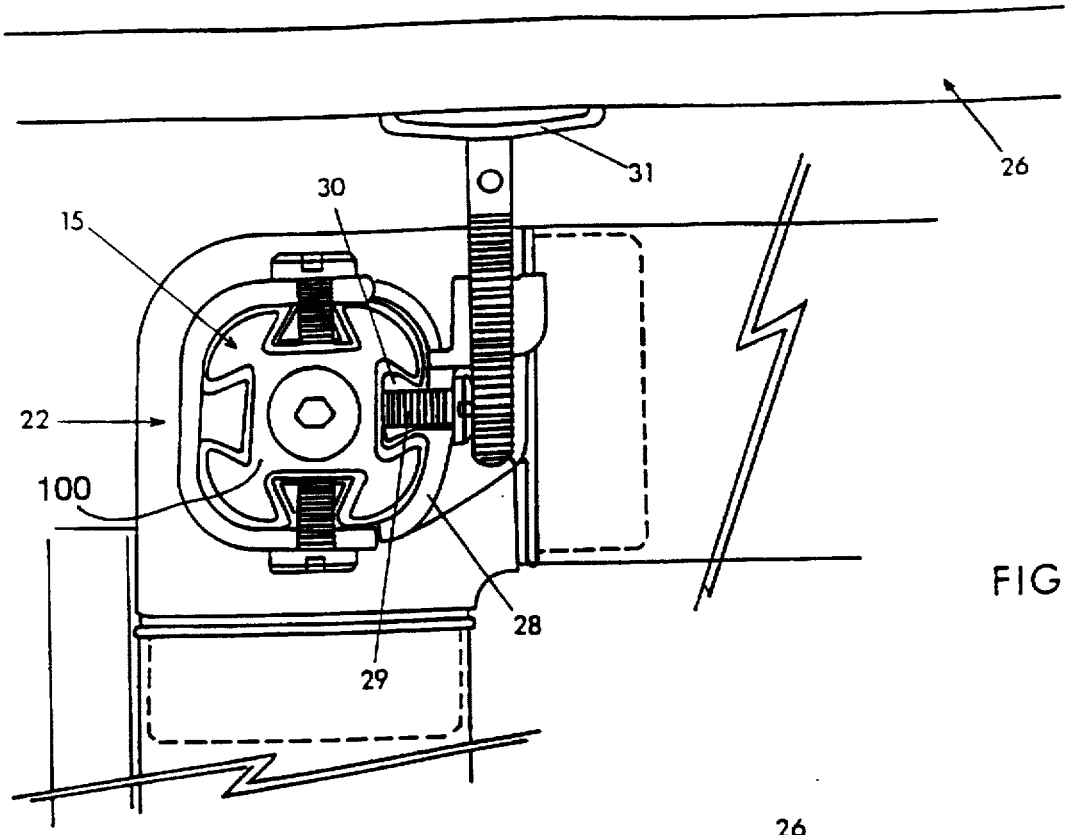
FIG. 6 is a detail view of a joint in a structure of the invention as shown sectionally.

In order to mount a bench (see FIG. 6), this is obtained by fitting supports 28 to beams 100. These supports 28 each comprise a section member or the like, which is of a shape to fit the profile of the associated beam, and which is locked in place on this latter by the aid of screws 29 engaging with corresponding clamping means 30 inserted in beam grooves 14.

Then, adjustable feet or bearing means 31 for the working table 26, corresponding in number to supports 28, are screwed on these supports 28.

Figure 8:
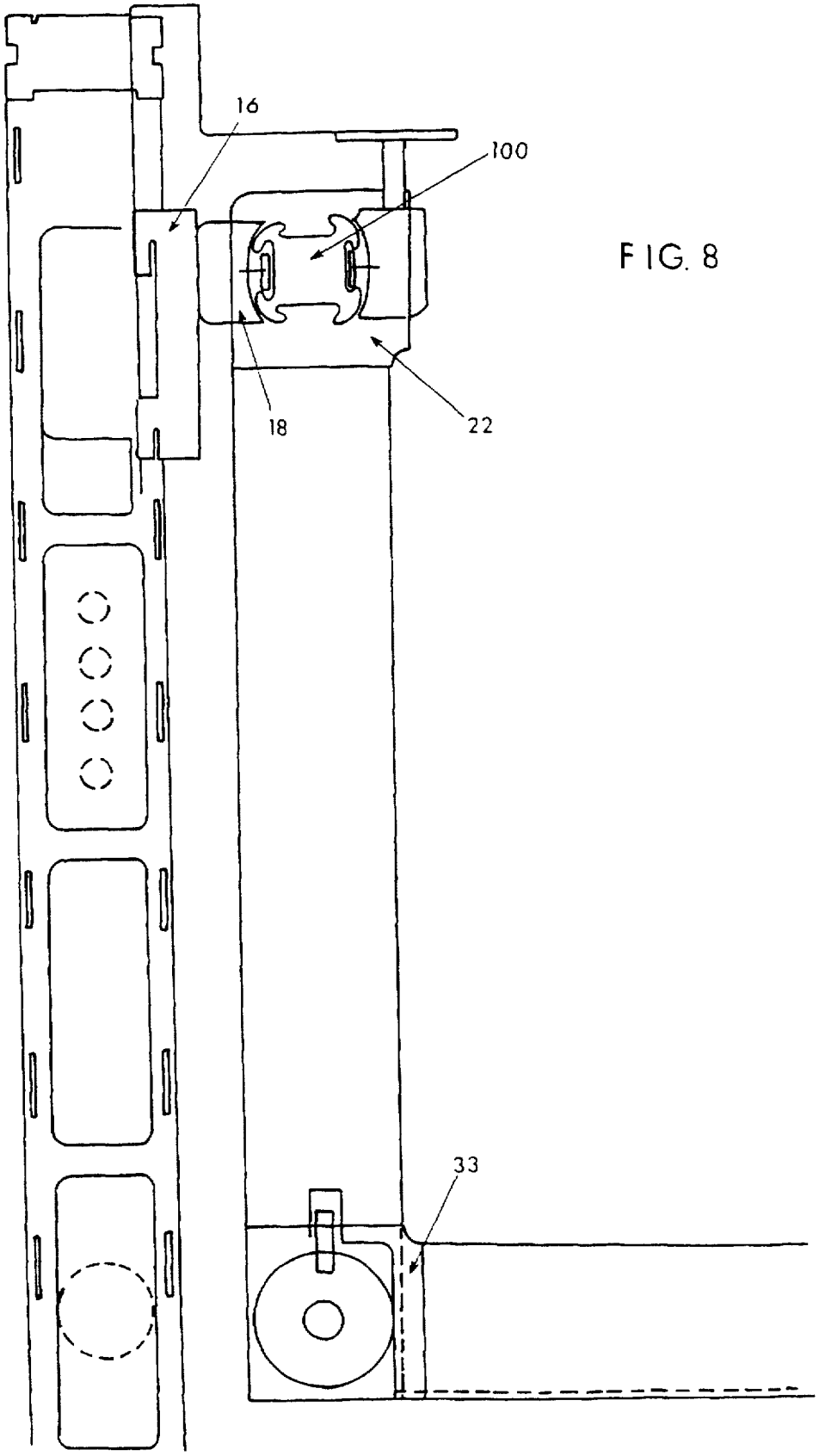
FIG. 8 is a detail sectional view of an equipped wall of the invention showing the region of the attaching devices for a bench, in a vertical direction.

The piece of furniture 27 is, on the other hand, mounted to beams 100 in a slidable manner as particularly shown FIGS. 8, 9a and 9b.

More specifically, fitted to the structure of the piece of furniture are upper and lower support carriages 32 and 33 (FIGS. 9a and 8, respectively). Each carriage 32 comprises a suitably shaped section member which is provided with a handle 34 and on which a pair of wheels 35 are mounted, these wheels being able to run in upper groove 14 of the associated beam. Likewise, the lower support carriage is provided with wheels which can run in the corresponding beam.

This enables an operator to displace the piece of furniture to either sides of the workbench according to his particular requirements.

The wall can then, in addition to receive shelves, supports etc . . . . be fitted with utility panels which may include devices for supplying electricity and admitting utility fluids.

These panels are so constructed as to have said supply devices entirely received inside the wall in flush-relationship therewith.

In FIGS. 10a and 10b the panels with the devices for gas and water supply, respectively, are shown in sectional horizontal views.

The panel in FIG. 10a has a front wall 36 defining a recess within which the fluid supply cocks 37 are located, the fluid coming from a conduit 38 in the wall.

In a like manner, the water supply panel has a wall, again designated by reference number 36, which defines a variable depth cavity where cocks 39 are installed, the bottom of the cavity forming a basin 40 leading to a discharge pipe.

Figure 13:
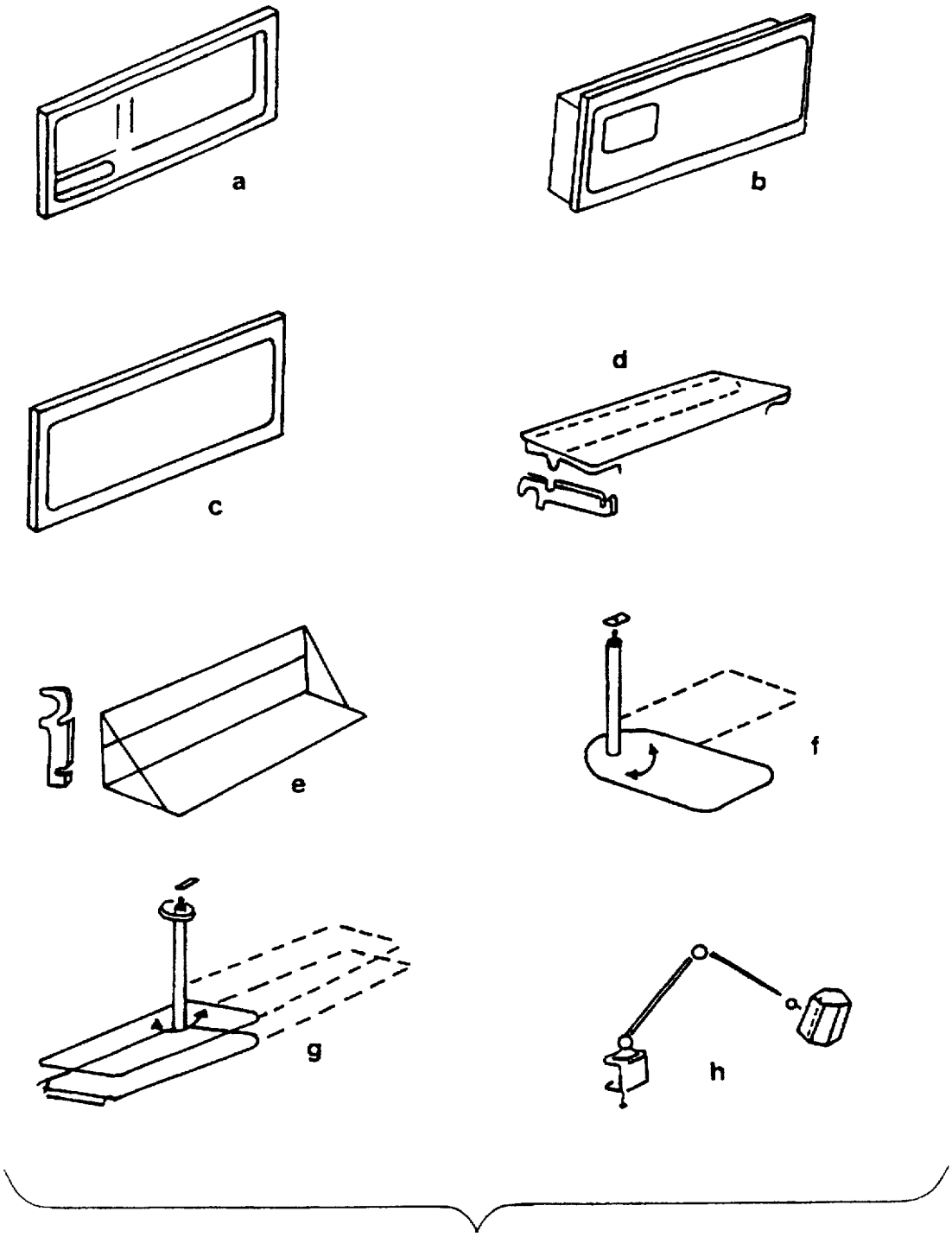
FIGS. 13a to 13h schematically show various utility panels or accessory elements to be mounted to an equipped wall in accordance with the invention.

Such a fluid control panel is shown FIG. 13a in a perspective view.

Figure 11:
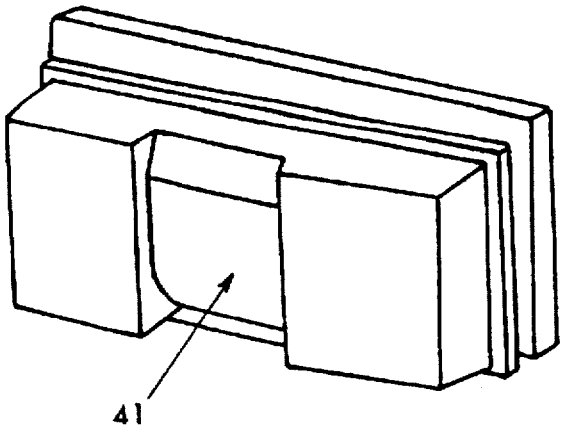
FIG. 11 is a perspective view as seen from behind an utility panel to be fitted to an equipped wall according to the invention.

Also, shown in FIG. 13b is an electrical panel, a rear part of which is seen FIG. 11 and is shaped so as to have, for example in a middle portion thereof, a reduced-depth region 41 providing a given space for passage of any cables leading to further panels placed in an upper area.

Finally, various other devices, as shown FIGS. 13d to 13h, can be fitted to a concerned wall, particularly to beams 100 thereof.

In order to mount these devices use may be made of bracket means 42 that are shaped so as to define a pair of arms capable of engaging around an associated beam through a catch means 43 which enters one beam groove 14 to lock the bracket against rotation while permitting it to be slidingly moved along the beam to fix the bracket in a most convenient position thereon.

Then, these fixed brackets may be used for securing in place reagent tables (FIG. 13d), book shelves (FIG. 13e), computer supports (FIG. 13f), bottle trays (FIG. 13g).

In a like manner, multipurpose lamps (FIG. 13h) or other fixtures as currently used in laboratories, can be fitted in place.

It should be apparent from the above description that many advantages are offered by the system of the invention which has eliminated the net separation—inherent in prior art systems—between an equipped wall and a bench, thereby providing great flexibility in combining and arranging preassembled and presized structure units.

The peculiar mounting system used for the pieces of furniture, which are at any time kept in spaced relationship with both the floor and the wall, permits efficient constant cleaning to be maintained in a room: an imperative requisite, for example, in case of aseptic rooms.

The utility panels, all of which are the same in size and, thus, interchangeable, can be easily moved to, and relocated in other wall areas, thereby to vary as necessary the distribution of the utilities.

The peculiar shape of the beams enables rapid and easy mounting not only of pieces of furniture and workbenches, but also of a wide variety of fittings and accessories which can be fitted in place directly by an user in a fast and simple manner, without having to accurately plan each working station at the time when designing an equipped wall, that is when it is not yet possible to precisely know what about the definitive, very requirements of an user in connection with that equipped wall.

It is possible, when necessary, to operate a rearrangement of interior spaces without having recourse to any substantial masonry work, which is to entire benefit of an economical system.

Obviously, many changes and modifications, as well as many different embodiments based on the same principle as described above, may be thought by one skilled in the art, without departing from the spirit and scope of this invention, as defined in the appended claims.

I claim:

1. A modular equipped wall and workbench system comprising:

a plurality of uprights defining openings for passage of cables and pipes and also defining slots;

a plurality of crosspieces connected to said plurality of uprights, said plurality of crosspieces defining openings for passage of cables and pipes;

C-shaped holder means for connecting said plurality of uprights to said plurality of said crosspieces, said C-shape holder means having a C-like shape attached on one side to an end of said crosspieces, and including legs of said C-like shape extending beyond said end, said legs including catch means for engaging with slots of said plurality of uprights, said C-shape holder means also including a block and screw means for sliding said block against said uprights, and locking said catch means in position with said slots of said upright.

2. A modular equipped wall and workbench system comprising:

a plurality of uprights defining openings for passage of cables and pipes and also defining slots;

a plurality of crosspieces connected to said plurality of uprights, said plurality of crosspieces defining openings for passage of cables and pipes;

a beam connected to said plurality of uprights, said beam defining a plurality of grooves extending longitudinally along said beam; and beam support means for connecting an end of said beam to one of said plurality of uprights, said beam support means including a plate, and said plate including a beam catch means for engaging with said slots of said plurality of uprights, said beam support means also including a terminal fastener means fitted to said end of said beam, said plate of said beam support means defining an opening receiving said terminal fastener.

3. A system in accordance with claim 2, wherein:

said terminal fastener means includes a plurality of fastener plates positioned in said grooves of said beam each of, said fastener plates defining a hole and said terminal fastener means including a clamping screw means for clamping said each of said fastener plates to said terminal fastener means.

4. A system in accordance with claim 2, further comprising:

carriage support means for mounting furniture to said beam, said carriage support means including wheels rollable in said grooves of said beam, and said carriage support means being also for moving said furniture along said beam.

5. A system in accordance with claim 4, wherein:

said carriage support means is attached to said furniture at a first corner and another carriage support means is attached to said furniture at a second corner, said second corner being substantially opposite said first corner.

6. A system in accordance with claim 4, wherein:

said furniture is a workbench including a pair of sidewalls formed of tubular members connected by angle members, said pair of sidewalls being connected by another beam substantially similar to said beam, said sidewalls and said another beam being connected by a workbench fastener means substantially similar to said terminal fastener means.

7. A system in accordance with claim 6, further comprising:

bench support means for supporting a bench and including holder means with a bench-bearing foot which is adjustable in height, said holder means having a shape for fitting around said beam, and said holder means including locking means for locking said bench support means to said another beam.

8. A system in accordance with claim 6, further comprising:

fitting holder means for mounting fittings on said beam, said fitting holder means having and end shape to be fitted on said beam, and said end including a fitting catch means for engaging with one of said grooves of said beam, and rotationally locking said end shape to said beam.

9. A system in accordance with claim 1 or claim 2, further comprising:

a panel fitted to said plurality of uprights and said plurality of crosspieces, said panel, said plurality of uprights and said plurality of crosspieces forming a wall structure; and connection means for connecting utilities to said panel, said connection means being entirely accommodated inside said wall structure.

10. A system in accordance with claim 9, wherein:

said panel has a recessed wall portion which defines a cavity; and fluid pipe connections and electrical pipe connection positioned in said cavity.

11. A system in accordance with claim 9, wherein:

said panel includes a base and means for water discharge, said base and means being contained within said wall structure.

12. A system in accordance with claim 9, wherein:

said panel contains electrical connections and said panel defines a reduced depth region providing passage behind said panel for calbes leading to an upper area of said wall structure.

*13. A modular equipped wall and workbench system comprising:*

*a plurality of uprights defining slots;*

*a plurality of crosspieces connected to said plurality of uprights; and*

*C-shaped holder means for connecting said plurality of uprights to said plurality of said crosspieces, said C-shaped holder means having a C-like shape attached on one side to an end of said crosspieces, and including legs of said C-like shape extending beyond said end, said legs including catch means for engaging with slots of said plurality of uprights, said C-shaped holder means also including a block and screw means for sliding said block against said uprights, and locking said catch means in position with said slots of said upright.*

* * * * *